United States Patent [19]

Williamson

[11] 4,324,942

[45] Apr. 13, 1982

[54] ELECTRIC GLASS MELTING FURNACE

[75] Inventor: Michael Williamson, Newark, Ohio

[73] Assignee: Owens-Corning Fiberglas Corporation, Toledo, Ohio

[21] Appl. No.: 218,882

[22] Filed: Dec. 22, 1980

[51] Int. Cl.[3] .................................................. C03B 5/02
[52] U.S. Cl. ........................................ 373/39; 373/41
[58] Field of Search ................................. 13/6, 23, 24

[56] References Cited

U.S. PATENT DOCUMENTS

| | | | |
|---|---|---|---|
| 2,490,339 | 12/1949 | DeVoe | 13/6 X |
| 3,395,237 | 7/1968 | Orton | 13/6 |
| 3,836,689 | 9/1974 | Holler et al. | 13/6 |
| 3,967,046 | 6/1976 | Froberg et al. | 13/6 |
| 3,985,944 | 12/1976 | Maddux | 13/6 |
| 4,211,887 | 7/1980 | Williamson | 13/6 |
| 4,224,459 | 9/1980 | Froberg | 13/6 |
| 4,245,132 | 1/1981 | Chrisman | 13/6 |

*Primary Examiner*—Roy N. Envall, Jr.
*Attorney, Agent, or Firm*—Ronald C. Hudgens; Patrick P. Pacella; Paul T. Kashimba

[57] ABSTRACT

An electric furnace for heating glass by the Joule effect comprising: a chamber adapted for holding a body of molten glass; a plurality of electrodes positioned in the chamber such that the electrodes form a zone with two clusters of electrodes in the zone, the clusters being located on opposite sides of the chamber, each of the clusters comprising first and second sets of electrodes, the first set being positioned closer to the other cluster than the second set and the first and second sets being positioned such that the second set of electrodes carries at least 60% of the current carried by the first set; and a source of power connected to the clusters.

10 Claims, 1 Drawing Figure

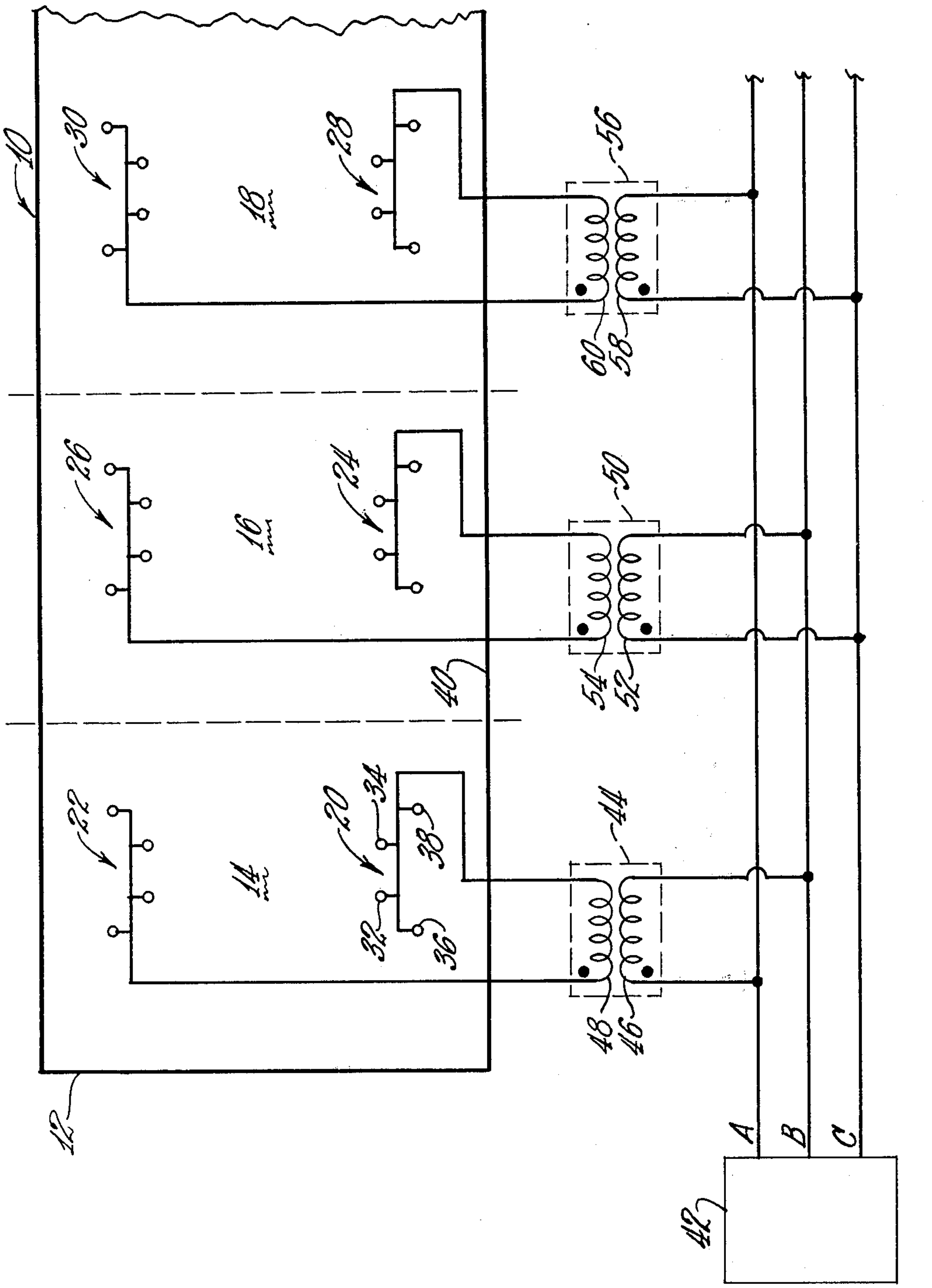
10
12
14
16
18
20
22
24
26
28
30
32
34
36
38
40
42
44
46
48
50
52
54
56
58
60
A
B
C

ELECTRIC GLASS MELTING FURNACE

BACKGROUND OF THE INVENTION

This invention relates to the production of glass and ceramic materials made by melting particulate batch ingredients or minerals, including basalt and the like, and, more particularly, to an electric furnace for heating such glass by the Joule effect.

Electric glass melting furnaces have a plurality of submerged electrodes that are positioned in the furnace in a predetermined pattern. An electric current is caused to flow through the molten glass between the electrodes to heat the glass by the Joule effect. The positioning of the electrodes in the furnace and the phase angle relationship of the power supplied to such electrodes determines the amount of current that flows in desired pathways within predetermined zones in the furnace and the amount of current that flows between zones. This interzone current may interfere with the efficient operation of the furnace. In addition, the erosion of the sidewall refractory and of the electrodes themselves is also determined by the positioning of the electrodes.

Therefore, it is an object of this invention to provide an electric furnace having a plurality of electrodes positioned such that the currents between zones in the furnace are reduced and electrode and refractory wear are minimized.

SUMMARY OF THE INVENTION

In accordance with the present invention there is provided an electric furnace for heating glass by the Joule effect. The subject furnace comprises a chamber adapted for holding a body of molten glass; a plurality of electrodes positioned in the chamber such that the electrodes form a zone with two clusters of electrodes in the zone, the clusters being located on opposite sides of the chamber, each of the clusters comprising first and second sets of electrodes, the first set being positioned closer to the other cluster than the second set and the first and second sets being positioned such that the second set of electrodes carries at least 60% of the current carried by the first set; and a source of power connected to the clusters.

In the preferred embodiment, the present invention provides an electric furnace for heating glass by the Joule effect, such furnace comprising: a chamber adapted for holding a body of molten glass; a plurality of electrodes positioned in the chamber such that the electrodes form three zones with two clusters of electrodes in each of the zones, the clusters being located on opposite sides of the chamber, each of the clusters comprising a first set of two electrodes being positioned in a row and located a first predetermined distance from the other cluster in the zone and a second predetermined distance, from each other and a second set of two electrodes being located in a row and positioned a third predetermined distance from the other cluster in the zone and a fourth predetermined distance from each other, the third predetermined distance being greater than the first predetermined distance and the fourth predetermined distance being greater than the second predetermined distance, the first and second rows being parallel to each other, and the first and second sets being positioned such that the second set of electrodes carries at least 60% of the current carried by the first set of electrodes; and first, second and third sources of power, each of the power sources being connected to the clusters of a separate zone and being phase related and connected to produce a phase angle relationship between the adjacent zones.

The present invention utilizes an electrode firing system having many electrodes but only a few zones, thereby reducing the power density around each individual electrode to lower the adjacent temperatures, convection and wear. By positioning the electrodes in each cluster such that the rear electrodes of the cluster carry at least 60% of the current carried by the forward electrodes, premature wear of any of the electrodes in the cluster is prevented. Preferably, 60 degree phasing between adjacent zones is utilized in the present invention; however, other phasing, such as 90 and 120 degrees between adjacent zones, can be used.

Other objectives, advantages and applications of the present invention will be made apparent by the following detailed description of the preferred embodiments of the invention.

BRIEF DESCRIPTION OF THE DRAWING

The FIGURE is a schematic plan view of a glass melting furnace utilizing the present invention.

DETAILED DESCRIPTION OF THE PREFERRED EMBODIMENT

Referring to the FIGURE, a glass melting furnace utilizing the present invention is indicated generally at 10. Furnace 10 has a melting tank 12 from which glass is discharged past a skimmer block or submerged throat (not shown) to a discharge passage or forehearth (not shown). A plurality of electrodes extend upwardly through the bottom of melting tank 12 in a desired pattern, as described hereinafter in detail. The glass in tank 12 is melted by current flowing between the electrodes to form a pool of molten glass. Batch material is provided to furnace 10 by any suitable means (not shown) to provide a layer or blanket of batch material on the surface of the molten glass so that the batch blanket replenishes the molten glass that flows outwardly through the forehearth.

The electrodes are positioned in tank 12 such that there are three zones, 14, 16 and 18, with each zone having two clusters of electrodes. Zone 14 consists of clusters 20 and 22, zone 16 consists of clusters 24 and 26, and zone 18 consists of clusters 28 and 30. The electrodes that comprise each of the clusters are positioned in exactly the same manner; therefore, only the electrode configuration of cluster 20 will be discussed. Cluster 20 consists of four electrodes, 32, 34, 36 and 38. Electrodes 32 and 34 are positioned in a first row and electrodes 36 and 38 are positioned in a second row such that the first and second rows are parallel to one another and electrodes 32 and 34 are spaced farther from sidewall 40 than electrodes 36 and 38. In addition, the spacing between electrodes 32 and 34 is less than the spacing between electrodes 36 and 38. The various distances between the electrodes are modified such that electrodes 36 and 38 carry at least 60% of the current carried by electrodes 32 and 34, and, preferably, the current is balanced between electrodes 36 and 38 and electrodes 32 and 34.

The appropriate locations for the electrodes may be determined by math and physical modeling of the furnace in which the system is to be installed. Electrodes 36 and 38 should be a minimum of 2 ft. 6 in. from sidewall 40 and preferably 3 or 4 ft.; however, such distance should be determined by appropriate math or physical modeling for the furnace of interest to determine what distance is necessary to minimize refractory wear.

A power source 42 provides three phase alternating current that is phase separated by 120 degrees. Transformer 44 which provides power to zone 14 has its high voltage winding 46 connected to phases A and B of power source 42. One end of low voltage winding 48 of transformer 44 is connected to the electrodes of cluster 20 and the end is connected to the electrodes of cluster 22. Transformer 50 which provides power to zone 16 has its high voltage winding 52 connected to C and B phases and its low voltage winding 54 connected to clusters 24 and 26. Transformer 56 which provides power to zone 18 has its high voltage winding 58 connected to C and A phases and its low voltage winding 60 connected to clusters 28 and 30. The windings of all of the transformers are connected in normal polarity.

Any type of control apparatus can be utilized to control the amount of power provided to each zone. For example, either silicon controlled rectifiers connected in the secondary circuit of the transformers or on-load tap changers connected in the primary circuit of the transformers can be employed to provide equal or unequal amounts of power to the various zones in accordance with the desired furnace melting profile. If desired, the power provided to the zones can be provided by a single three phase transformer connected to provide 60 degree phasing between adjacent zones.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. An electric furnace for heating glass by the Joule effect, said furnace comprising: a chamber adapted for holding a body of molten glass; a plurality of electrodes positioned in said chamber such that said electrodes form a zone with two clusters of said electrodes in said zone, said clusters being located on opposite sides of said chamber, each of said clusters comprising first and second sets of electrodes, said first set being positioned closer to the other cluster than said second set and said first and second sets being positioned such that said second set of electrodes carries at least 60% of the current carried by said first set; and a source of power connected to said clusters.

2. An electric furnace as recited in claim 1, wherein said first and second sets of electrodes are positioned such that the currents carried by said first and second sets of electrodes are substantially balanced.

3. An electric furnace as recited in claim 1, wherein each of said first and second sets of each cluster comprises a plurality of electrodes positioned in a row with each of the respective rows being parallel to the other rows in said zone.

4. An electric furnace as recited in claim 3, wherein the end electrodes of said row of said first set of electrodes are separated by a first predetermined distance, the end electrodes of said row of said second set of electrodes are separated by a second predetermined distance, and said second predetermined distance is greater than said first predetermined distance.

5. An electric furnace as recited in claim 1, wherein said furnace comprises a plurality of said zones and said source of power comprises a plurality of sources with each of said sources being connected to the clusters of a separate zone and being phase related and connected to produce a phase angle relationship between adjacent zones.

6. An electric furnace as recited in claim 5, wherein said phase angle relationship is 60 degrees between adjacent zones.

7. An electric furnace as recited in claims 4 or 5, wherein each of said first and second sets of electrodes comprises two electrodes.

8. An electric furnace for heating glass by the Joule effect, said furnace comprising: a chamber adapted for holding a body of molten glass; a plurality of electrodes positioned in said chamber such that said electrodes form three zones with two clusters of said electrodes in each of said zones, said clusters in said zones being located on opposite sides of said chamber, each of said clusters comprising a first set of two electrodes being located in a first row and positioned a first predetermined distance from the other cluster in the respective zone and a second predetermined distance from each other and a second set of two electrodes being located in a second row and positioned a third predetermined distance from said other cluster in said respective zone and a fourth predetermined distance from each other, said third predetermined distance being greater than said first predetermined distance and said fourth predetermined distance being greater than said second predetermined distance, said first and second sets being positioned such that said second set of electrodes carries at least 60% of the current carried by said first set of electrodes and said first and second rows being parallel to each other; and first, second and third sources of power, each of said power sources being connected to the clusters of a separate zone and being phase related and connected to produce a phase angle relationship between adjacent zones.

9. An electric furnace as recited in claim 8, wherein said phase angle relationship is 60 degrees between adjacent zones.

10. An electric furnace as recited in claim 9, wherein said first and second sets of electrodes are positioned such that the currents carried by said first and second sets of electrodes are substantially balanced.

* * * * *